United States Patent
You et al.

(10) Patent No.: US 6,303,743 B1
(45) Date of Patent: Oct. 16, 2001

(54) POLYIMIDE FOR OPTICAL COMMUNICATIONS, METHOD OF PREPARING THE SAME, AND METHOD OF FORMING MULTIPLE POLYIMIDE FILM USING THE POLYIMIDE

(75) Inventors: Kyung-hee You; Kwan-soo Han, both of Seoul; Tae-hyung Rhee, Sungnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/441,888

(22) Filed: Nov. 17, 1999

(30) Foreign Application Priority Data

Nov. 18, 1998 (KR) ................................. 98/49506
Oct. 18, 1999 (KR) ................................. 98/45048

(51) Int. Cl.[7] ........................... C05G 73/10; C05G 69/28
(52) U.S. Cl. ................ 528/353; 528/125; 528/126; 528/128; 528/170; 528/171; 528/172; 528/173; 528/174; 528/175; 528/176; 528/179; 528/183; 528/185; 528/188; 528/220; 528/229; 528/350; 528/352; 427/162; 427/256; 427/258; 427/362; 427/372.2; 264/299; 264/330; 264/331.11; 264/331.16
(58) Field of Search ........................ 528/353, 125, 528/128, 126, 171, 172, 173, 174, 175, 176, 179, 185, 183, 188, 220, 229, 350, 352; 427/162, 256, 258, 362, 372.2; 264/299, 330, 331.11, 331.16

(56) References Cited

U.S. PATENT DOCUMENTS

| | | | |
|---|---|---|---|
| 5,108,201 | * 4/1992 | Matsuura et al. | 385/143 |
| 5,137,751 | * 8/1992 | Burgess et al. | 427/123 |
| 5,317,082 | * 5/1994 | Beuhler et al. | 528/353 |
| 5,324,813 | * 6/1994 | Hougham et al. | 528/353 |
| 5,332,535 | * 7/1994 | Oguchi et al. | 264/1.7 |
| 5,344,916 | * 9/1994 | Harris et al. | 528/353 |
| 5,464,927 | * 11/1995 | Angelopoulos et al. | 528/350 |
| 5,480,964 | * 1/1996 | Harris et al. | 528/353 |
| 5,649,045 | * 7/1997 | Fjare et al. | 385/145 |
| 5,780,199 | * 7/1998 | Angelopoulos et al. | 430/270 |
| 5,849,934 | * 12/1998 | Ando et al. | 549/241 |
| 6,040,418 | * 3/2000 | Yamamoto et al. | 528/353 |
| 6,067,139 | * 5/2000 | Böhm et al. | 349/123 |
| 6,084,058 | * 7/2000 | Murata et al. | 528/353 |
| 6,100,371 | * 8/2000 | Suh et al. | 528/353 |

* cited by examiner

Primary Examiner—P. Hampton-Hightower
(74) Attorney, Agent, or Firm—Robert E. Bushnell, Esq.

(57) ABSTRACT

A polyimide for optical communications, which is expressed by the formula (1), a method of preparing the same, and a method of forming multiple polyimide films using the polyimide, wherein the formula (1) is given by

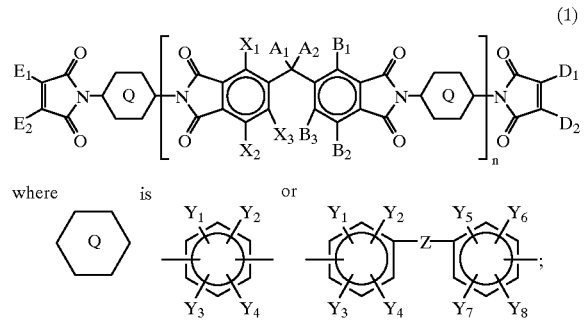

$X_1$, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —SO$_3$—, —S—, —(T)$_m$—, —(OT)$_m$— and —(OTO)$_m$—, wherein T is alkylene or arylene group substituted by at least one of halogen atom and halogenated alkyl group and m is an integer from 1 to 10; and n is an integer from 1 to 39. Because the polyimide expressed by the formula (1) has a lower birefringence than a common polyimide used as a material for optical waveguiding, a problem associated with the dependency of optical characteristics on polarization can be solved. Also, the solubility of the polyimide in an organic solvent is lowered, so that the occurrence of cracks in a polyimide layer can be avoided in the case of forming multiple polyimide films.

34 Claims, 1 Drawing Sheet

POLYIMIDE FOR OPTICAL COMMUNICATIONS, METHOD OF PREPARING THE SAME, AND METHOD OF FORMING MULTIPLE POLYIMIDE FILM USING THE POLYIMIDE

CLAIM OF PRIORITY

This application makes reference to, incorporates the same herein, and claims all benefits accruing under 35 U.S.C. §119 from my applications POLYIMIDE FOR OPTICAL COMMUNICATIONS, METHOD OF PREPARING THE SAME, AND METHOD OF FORMING MULTIPLE POLYIMIDE FILM USING THE POLYIMIDE filed with the Korean Industrial Property Office on Nov. 18, 1998 and there duly assigned Serial No. 49506/1998, and POLYIMIDE FOR OPTICAL COMMUNICATIONS, METHOD OF PREPARING THE SAME, AND METHOD OF FORMING MULTIPLE POLYIMIDE FILM USING THE POLYIMIDE filed with the Korean Industrial Property Office on Oct. 18, 1999 and there duly assigned Serial No. 45048/1999.

BACKGROUND OF THE INVENTION

1. Field of the Invention

The present invention relates to polyimides as optical polymers for use in manufacturing optical communication devices for optical communications, and to methods of preparing polyimides, and methods of forming multiple polyimide film layers.

2. Description of the Related Art

An ideal optical material for use in manufacturing optical communication devices has low optical loss at a wavelength of 1300–1500 nm for optical communications. Optical loss in this wavelength range is caused by overtones of harmonics due to stretching and deformation vibrations of carbon and hydrogen bonds (C—H) in alkyl, phenyl and other similar functional groups. Thus, using a common polymer as a material for optical waveguides that utilize light in this near infrared wavelength range is not desirable due to a large optical transmission loss. In order to reduce optical transmission loss, the light absorption wavelength of the polymer should be shifted from a near infrared light wavelength region to a longer or shorter wavelength region. To this end, a method for substituting hydrogen of the carbon and hydrogen (C—H) bond by fluorine (F) has been suggested.

Also, an optical material for use in manufacturing an optical communications device such as an opto-electronic integrated circuit (OEIC), an opto-electrical mixed wiring board (OEMWB), a hybrid integration device or a plastic optical fiber requires thermal stability during a manufacturing process. Because the thermal resistance of the optical material is very important, glass transition temperature, thermal decomposition temperature, thermal expansion coefficient and birefringence of the optical material should be carefully considered.

Polyimide is widely known as a polymer having good thermal resistance. Because polyimide has a resistance to heat at a high temperature, for example, approximately 400° C., great efforts are being made to utilize polyimide as a material for optical communications.

However, in general, polyimides have many C—H bonds in the molecules, so that optical absorption loss is large at the near infrared region. To avoid this problem, a polyimide whose hydrogen of C—H bond is partially or completely substituted for fluorine (F) has been reported.

However, as the F content in the polyimide increases, solubility of the polyimide in the organic solvent which is commonly used in the formation of a polyimide film, also increases. Thus, in the case of forming multiple polyimide films, a lower polyimide film is partially solubilized in the organic solvent used to form an upper polyimide film, causing cracks to occur in the lower polyimide film. Such cracks cause optical scattering loss, thereby increasing optical loss. Also, polyimide films has a large birefringence, so that there is a problem in that optical waveguiding characteristics vary in accordance with the degree of polarization during optical waveguiding.

SUMMARY OF THE INVENTION

It is therefore an object of the present invention to provide an improved polyimide for use in optical waveguides.

A further object of the invention is to provide an improved method of making polyimides for optical waveguides.

A yet further object is to provide an improved method of forming polyimide films layer in optical waveguides.

A still further object is to provide a polyimide which has a lower solubility in the organic solvents used to form upper film layers.

Another object is to provide a polyimide which has a lower tendency to crack in multiple films.

Still another object is to provide a polyimide which has a lower birefringence.

Yet another object is to provide a polyimide with low light loss in the near infrared region.

Yet another object is to provide a polyimide with low light loss due to scattering.

According to an aspect of the present invention, there is provided a polyimide for optical communications, expressed by the formula (1):

$X, X_2, X_3, A_1, A_2, B_1, B_2, B_3, D_1, D_2, E_1, E_2, Y_1, Y_2, Y_3, Y_4, Y_5, Y_6, Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —SO$_2$—, —S—, —(T)$_m$—, —(OT)$_m$— and —(OTO)$_m$—wherein T is alkylene or arylene group substituted by at least one of halogen atom and halogenated alkyl group, and m is an integer from 1 to 10; and n is an integer from 1 to 39.

Preferably, $A_1$ and $A_2$ are independently fluorine atom or fluorinated alkyl group; $Y_1, Y_2, Y_3, Y_4, Y_5, Y_6, Y_7$, and $Y_8$ are independently selected from the group consisting of fluorine atom, fluorinated alkyl group and fluorinated aryl group; Q is a single bond or selected from the group consisting of —C(CF$_3$)$_2$—, —O—, —CO— and —SO$_2$—; and $D_1, D_2, E_1$, and $E_2$, are all hydrogen. Also, the polyimide may be selected from the compounds expressed as follows:

According to another aspect of the present invention, there is provide a method of preparing a polyimide for optical communications, the polyimide expressed by the formula (1), the method comprising the steps of: (a1) polymerizing an acid anhydride (A) and a diamine compound (B), which are shown in the following reaction scheme, in a mole ratio of 0.7:1 to 0.98:1; (a2) adding a substituted maleic anhydride (C) to the reaction mixture of the step (a1) to synthesize a polyamic acid (D); and (a3) imidizing the polyamic acid (D), wherein the reaction scheme is given by where  is or X, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —$SO_2$—, —S—, —$(T)_m$—, —$(OT)_m$— and —$(OTO)_m$—wherein T is alkylene or arylene group substituted by at least one of halogen atom and halogenated alkyl group, and m is an integer from 1 to 10; and n is an integer from 1 to 39.

Preferably, the acid anhydride (A) and diamine (B) are mixed in a mole ratio of 0.7:1 to 0.98:1, and more preferably, 0.9:1 to 0.95:1.

In another embodiment, the present invention provides a method of preparing a polyimide for optical communications, the polyimide expressed by the formula (1), the method comprising the steps of: (b1) adding a substituted maleic anhydride (C), which is shown in the following reaction scheme, to a mixture of an acid anhydride (A) and a diamine compound (B) in a mole ratio of 0.1: 1–0.98:1, and polymerizing the mixture to synthesize a polyamic acid (D); and (b2) imidizing the polyamic acid (D), wherein the reaction scheme is given by X, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —$SO_2$—, —S—, —$(T)_m$—, —$(OT)_m$— and —$(OTO)_m$—wherein T is alkylene or arylene group substituted by at least one of halogen atom and halogenated alkyl group, and m is an integer from 1 to 10; and n is an integer from 1 to 39.

Preferably, in the steps (a2) and (b2), the amount of substituted maleic anhydride is 0.01–0.3 mole relative to the moles of the diamine compound. Also, in the steps (a3) and (b2), the imidization may be performed by mixing the polyamic acid with an acetic anhydride and pyridine and then heating the mixture at 60–150° C., or by adding toluene to the polyamic acid and heating the mixture to the boiling point of toluene. The polyamic acid may be imidized through heating by steps within a temperature range of 50–400° C.

According to another aspect of the present invention, there is provided a method of forming multiple polyimide layers by repeating the steps of: (c1) coating a substrate with a composition containing a polyimide expressed by the formula (1) or a polyamic acid expressed by the formula (2), and a solvent, and heating the substrate to form a first polyimide film; and (c2) coating a composition containing the polyimide expressed by the formula (1) or the polyamic acid expressed by the formula (2), and a solvent on the first polyimide film formed on the substrate, and heating the resultant structure to form a second polyimide film on the fist polyimide film, wherein the formulas (1) and (2) are

DESCRIPTION OF THE PREFERRED EMBODIMENTS

In the preparation of a polyimide according to the present invention, a mixing mole ratio of an acid anhydride as a monomer for the polyimide, and a diamine is adjusted to a mole ratio of 0.7: 1–0.98:1 to reduce the molecular weight of the polyimide to be lower than that of a common polyimide, so that birefringence of the resultant polyimide is lowered. As a result, the problem associated with waveguid- $X, X_2, X_3, A_1, A_2, B_1, B_2, B_3, D_1, D_2, E_1, E_2, Y_1, Y_2, Y_3, Y_4, Y_5, Y_6, Y_7,$ and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —$SO_2$—, —S—, —$(T)_m$—, —$(OT)_m$— and —$(OTO)_m$—wherein T is alkylene or arylene group substituted by at least one of halogen atom and halogenated alkyl group, and m is an integer from 1 to 10; and n is an integer from 1 to 39.

Common solvents which are used to form a polyimide film can be used as the solvent without restriction. More preferably, cyclohexanone, γ-butyrolactone or N,N-dimethylacetamide is used as the solvent.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

ing characteristics that depend on polarization, can be solved by using the polyimide according to the present invention, rather than using common polyimides. Also, in synthesizing a polyimide by reacting a cross-linking monomer and monomers used to form a polyimide in order to introduce a cross-linker to an end of a polyimide chain, the resultant polyimide comes to have a lower solubility in an organic solvent due to the network structure. In addition, in the case of forming multiple polyimide films using the resultant polyimide, the problem of dissolution of the lower polyimide film in an organic solvent used to form an upper polyimide film can be avoided.

Any compound having a functional group that is capable of cross-lining, for example, an unsaturated bond, can be used as the cross-linking monomer without restriction. In the present embodiment, a maleic anhydride is used as the cross-linking monomer.

The polyimide for optical communications, expressed as the formula (1), can be prepared by the following two methods.

In a first method, an acid anhydride and a diamine are polymerized in a mole ratio of 0.7:1 to 0.98:1, and more preferably, 0.9:1 to 0.95:1. Then, a substituted maleic anhydride at a mole ratio of 0.01 to 0.3, and more preferably, 0.05 to 0.2 mole, relative to the moles of the diamine compound, is added to the polymerized reaction mixture, and the mixture is reacted to synthesize a polyamic acid. Here, if the mixing mole ratio of the acid anhydride and diamine and the amount of substituted maleic anhydride are out of the above range, cracks occurs in the lower polyimide film. Then, the polyamic acid is imidized.

Imidization of the polyamic acid into a polyimide can be performed by a chemical method or a thermal method. In the chemical method, acetic acid anhydride and pyridine are added to the mixture of acid anhydride (A) and diamine compound (B), and heated at 60–150° C. Otherwise, toluene is added to the mixture containing the acid anhydride (A) and the diamine compound (B), and the mixture is heated to the boiling point of toluene. In the thermal method, the polyamic acid is heated in steps within a range of 50–400° C., and more preferably, 250–350° C.

As a second method of preparing the polyimide of the formula (1), a substituted maleic anhydride of 0.01 to 0.3 mole, relative to the mole ratio of diamine, is added to a mixture of an acid anhydride and the diamine in a mole ratio of 0.7:1 to 0.98:1, and then polymerized to prepare a polyamic acid. Then, the polyamic acid is imidized.

Preferably, the polyimide has a weight average molecular weight of 2000–15000, as determined by gel permeation chromatography. If the weight average molecular weight is not in the above range, a cross-linking effect by addition of maleic anhydride cannot be attained. In particular, if the weight average molecular weight of the polyimide is less than 2000, it is hard to form a thin film having good characteristics, for example, having an appropriate thickness.

For the formation of multiple polyimide films using the polyimide prepared by the above process, the polyimide expressed as the formula (1) or polyamic acid expressed as the formula (2) is dissolved in an organic solvent. Then, a substrate is coated with the solution and then heated to form a first polyimide film. Here, the polyamic acid of the formula (2) is a precursor of the polyimide of the formula (3). In the formation of a polyimide film using the polyamic acid, a thermal process is performed at a temperature of 50–400° C., and more preferably, 250–350° C.

The solution used in the above process is coated on the resultant substrate having the fust polyimide film, and then heated to form a second polyimide layer on the first polyimide film, thereby resulting in a dual-layered polyimide film.

By repeating the above process, more than one polyimide film can be formed on the second polyimide film, so that multiple polyimide films can be completed.

The acid anhydride used in the present invention is not limited to a specific compound. However, 2,2-bis(3,4-dicarboxyphenyl)hexafluoropropane dianhydride is preferred.

Also, the diamine compound used in the present invention is also not limited to a specific compound. For example, possible compounds for the diamine compound (B) may be bis(perfluorophenyl)alkanes, bis(perfluorophenyl)sulfones, bis(perfluorophenyl)ethers or α,α'-bis(perfluorophenyl) diisopropylbenzenes. Particular example of the diamine compound (B) include tetrafluoro-1,2-phenylenediamine, tetrafluoro-1,3-phenylendiamine, tetrafiuoro-1,4-phenyldiamine, tetrachloro-1,2-phenylenediamine, tetrachloro-1,3-phenylenediamine, tetrachloro-1,4-phenylenediamine, hexafluoro-1,5-diaminonaphthalene, hexafluoro-2,6-diaminonaphthalene, 3-trifluoromethyltrifluoro-1,2-phenylenediamine, 4-trifluoromethyltrifluoro-1,2-phenylenediamine, 2-trifluoromethylfluoro-1,3-phenylenediamine, 4-trifluoromethyltrifluoro-1,3-phenylenediamine, 5-trifluoromethyltrifluoro-1,3-phenylenediamine, 2-trifluoromethyltrifluoro-1,4-phenylenediamine, 3-pentafluoroethyltrifluoro-1,2-phenylenediamine, 4-pentafluoroethyltrifluoro-1,2-phenylenediamine, 2-pentafluoroethyltrifluoro-1,3-phenylenediamine, 4-pentafluoroethyltrifluoro-1,3-phenylenediamine, 5-pentafluoroethyltrifluoro-1,3-phenylenediamine, 2-pentafluoroethyltrifluoro-1,4-phenylenediamine, 3 ,4-bis(trifluoromethyl)difluoro-1,2-phenylenediamine, 3,5-bis(trifluoromethyl)difluoro-1,2-phenylenediamine, 2,4-bis(trifluoromethyl)difluoro-1,3-phenylenediamine, 4,5-bis(trifluoromethyl)difluoro-1,3-phenylenediamine, 2,3-bis(trifluoromethyl)difluoro-1,4-phenylenediamine, 2,5-bis(trifluoromethyl)difluoro-1,4-phenylenediamine, 3 ,4-bis(trifluoromethyl)difluoro-1,2-phenylenediamine, 3-trifluoromethoxytrifluoro-1,2-phenylenediamine, 4-trifluoromethoxytrifluoro-1,2-phenylenediamine, 2-trifluoromethoxytrifluoro-1,3-phenylenediamine, 4-trifluoromethoxytrifluoro-1,3-phenylenediamine, 5,-trifluoromethoxytrifluoro-1,3-phenylenediamine, 2-trifluoromethoxytrifluoro-1,4-phenylenediamine, 3, 4,5-tris(trifluoromethyl)fluoro-1,2-phenylenediamine, 3,4,6-tris(trifluoromethyl)fluoro-1, 2-phenylenediamine, 2,4,5-tris(trifluoromethyl)fluoro-1,3-phenylenediamine, 2, 4,6-tris(trifluoromethyl)fluoro-1,3-phenylenediamine, 4,5,6-tris(trifluoromethyl)fluoro-1, 3-phenylenediamine, tetrakis(trifluoromethyl)-1,2-phenylenediamine, tetrakis(trifluoromethyl)-1, 3-phenylenediamine, tetrakis(trifluoromethyl)-1,4-phenylenediamine, 3,3'-diaminooctafluorobiphenyl, 3,4'-diaminooctafluorobiphenyl, 4,4'-diaminooctafluorobiphenyl, 3,3'-diaiooctachlorobiphenyl, 3,4'-diaminooctachlorobiphenyl, 4,4'-diaminooctachlorobiphenyl, 2,2'-bis(trichloromethyl)-4,4'-diaminohexachlorobiphenyl, 3,3'-bis(trichloromethyl)-4,4'-diaminohexafluorobiphenyl, bis(4-aminotetrafluorophenyl)dichloromethane, 1,2-bis(4-aminotetrafluorophenyl)tetrachloroethane, 2,2-bis(4-aminotetrafluorophenyl)hexachloropropane, 2,2'-bis(trifluoromethyl)-4, 4'-diaminohexachlorobiphenyl, 3,3'-bis(trifluoromethyl)-4,4'-diaminohexafluorobiphenyl, bis(4-aminotetrafluorophenyl)difluoromethane, 1,2-bis(4-aminotetrafluorophenyl)tetrachloroethane, 2,2-bis(4-aminotetrafluorophenyl)hexafluoropropane, bis(3-aminotetrafluorophenyl)ether, 3,4'-diaminooctafluorobiphenylether, bis(4-aminotetrafluorophenyl)ether, bis(3-aminotetrachlorophenyl)ether, 3,4'-diaminooctachlorobiphenylether, bis(4-aminotetrachlorophenyl)ether, 3,3'-diaminooctafluorobenzophenone, 3,4'-diaminooctafluorobenzophenone, 4,4'-diaminooctafluorobenzophenone, bis(3-aminotetrafluorophenyl)sulfone, 4,4'-diaminooctafluorobiphenylsulfone, bis(4-aminotetrafluorophenylsulfone), bis(3-aminotetrafluorophenyl)sulfide, 3,4'-diaminooctafluorobiphenylsulfide, bis(4-aminotetrafluorophenyl)sulfide, 4-aminotetrafluorophenoxy-4'-aminotetrafluorophenyldifluoromethane, bis(4- aminotetrafluorophenoxy)difluoromethane, 1,2-bis(4-aminotetrafluorophenoxy)tetrafluoroethane, 2,2-bis(4-aminotetrafluorophenoxy)hexafluoropropane, bis(4-aminotetrafluorophenoxy)dichloromethane, 1,2-bis(4-aminotetrafluorophenoxy)tetrachloroethane, 2,2-bis(4-aminotetraflurophenoxy)hexachloropropane, 4,4"-diaminododecafluoro-p-terphenyl, 2',3'-bis(trifluoromethyl)-4,4"-diamino-p-terphenyl, 2,2"-bis(trifluoromethyl)-4, 4"-diamino-p-terphenyl, 2',5'-bis(trifluoromethyl)-4,4"-diaminoterphenyl, 2,7-diaminohexafluorodibenzofuran, 1,4-bis(4-aminotetrafluorophenoxy)tetrafluorobenzene, 2,6-diaminohexafluoronaphthalene, 2,7-dianinooctafluorophenanthrene, 2,6diaminooctafluoroanthracene, 2,7-diaminohexathianthrene, 2,6-diaminohexafluoroanthraquinone, 2,6-diaminohexafluorobiphenylene, 2,6-diaminooxtafluoroanthrone, 2,7-diaminotetrafluorodibenz[b,e] 1,4-dioxane, 2,2'-bis(4-aminophenyl)hexafluoropropane, 2,2'-bis(4-aminophenyl)hexachloropropane, 2,4-diaminobenzotrifluoride, 2,2-bis(trifluoromethyl)benzidine, 2,2-bis [4-(4-amino-2-trifluorophenoxy)phenyl]hexafluoropropane, 2,2-bis[4,4-amino-2-trifluorophenoxy)phenyl]hexachloropropane, 3,4-diaminobenzotrifluoride, 3,5-5 diaminobenzotrifluoride, 2,5-diaminobenzotrifluoride, 2,2-bis[4-(4-aminophenoxy)phenyl]hexafluoropropane, 2,2-bis [4-(4-amino phenoxy)phenyl]hexachloropropane, or 3,4-diamino-1-fluorobenzene.

Hereinafter, the present invention will be described in detail through the following examples. However, the present invention is not limited to the following examples.

Example 1

2,2-bis(3,4-dicarboxyphenyl)hexafluoropropane dianhydride and 2,2'-bis(trifluoromethyl)benzidine in a mole ratio of 0. 95: 1, and N,N-dimethylacetamide were mixed. Then, maleic anhydride, in 0.05 mole ratio with respect to 2,2'-bis(trifluoromethyl)benzidine, was added to the mixture and reacted under a nitrogen atmosphere for 24 hours.

Then, acetic anhydride and pyridine were added to the reaction mixture, and the mixture was reacted under a nitrogen atmosphere at room temperature for 24 hours.

After the reaction was completed, the reaction mixture was dropwise added to methanol to form a precipitate. The obtained precipitate was filtered and washed with methanol several times. Then, the resultant was dried in a vacuum oven set to 50° C. for 24 hours, resulting in a polyimide expressed by the following formula (having a weight average molecular weight of 15,000).

1 g of the polyimide was dissolved in 5 g of a solvent mixture containing cyclohexanone and γ-butyrolactone in a ratio of 1:1 by weight, to form a coating mixture and then the coating mixture was spin coated on a silicon substrate. The silicon substrate was thermally-treated at 20° C., resulting in a first polyimide film.

Then, the coating mixture was again spin coated on the silicon substrate having the first polyimide film, and the silicon substrate was thermally-treated at 200° C. to form a second polyimide film, and thus a dual-layered polyimide film was obtained.

EXAMPLE 2

2,2-bis(3,4-dicarboxyphenyl)hexafluoropropane dianhydride and 2,2'-bis(trifluoromethyl)benzidine in a mole ratio of 0.95:1, and N,N-dimethylacetamide were mixed. Then, the mixture was stirred for 24 hours for polymerization.

Then, 0.05 mole ratio of maleic anhydride, with respect to 2,2'-bis(trifluoromethyl)benzidine, was added to the reaction mixture and the mixture was reacted under a nitrogen atmosphere for 24 hours. Then, acetic anhydride and pyridine were added to the reaction mixture, and reacted under a nitrogen atmosphere at room temperature for 24 hours.

After the reaction was completed, the reaction mixture was dropwise added to methanol to form a precipitate. The obtained precipitate was filtered and washed with methanol several times. Then, the resultant was dried in a vacuum oven set to 50° C. for 24 hours, resulting in a polyimide expressed by the following formula (having a weight average molecular weight of 15,000).

1 g of the polyimide was dissolved in 5 g of a solvent mixture containing cyclohexanone and γ-butyrolactone in a ratio of 1:1 by weight, to form a coating mixture and then the mixture was spin coated on a silicon substrate. The silicon substrate was thermally-treated at 20°C., resulting in a first polyimide film.

Then, the coating mixture was again spin coated on the silicon substrate having the first polyimide film, and the silicon substrate was thermally-treated at 200° C. to form a second polyimide film, and thus a dual-layered polyimide film was obtained.

EXAMPLE 3

2,2-bis(3,4-dicarboxyphenyl)hexafluoropropane dianhydride and 3,5-diaminobenzotrifluoride in a mole ratio of 0.95:1, and N,N-dimethylacetamide were mixed. Then, maleic anhydride in 0.05 mole ratio with respect to 2,2'-bis (trifluoromethyl)benzidine, was added to the mixture and reacted under a nitrogen atmosphere for 24 hours.

Then, acetic anhydride and pyridine were added to the reaction mixture, and reacted under a nitrogen atmosphere at room temperature for 24 hours.

After the reaction was completed, the reaction mixture was dropwise added to methanol to form a precipitate. The obtained precipitate was filtered and washed with methanol several times. Then, the resultant was dried in a vacuum oven set to 50° C. for 24 hours, resulting in a polyimide expressed by the following formula (having a weight average molecular weight of 12,000).

was formed in the same manner as in Example 1, except that 2,2-bis(3,4-dicarboxyphenyl)hexafluoropropane dianhydride and 2,2'-bis(trifluoromethyl)benzidine were mixed in a mole ratio of 0.9:1.

EXAMPLE 5

A polyimide (having a weight average molecular weight of 6,000) was synthesized and a dual-layered polyimide film was formed in the same manner as in Example 2, except that 2,2-bis(3,4-dicarboxyphenyl)hexafluoropropane dianhydride and 2,2'-bis(trifluoromethyl)benzidine were mixed in a mole ratio of 0.9:1.

EXAMPLE 6

A polyimide (having a weight average molecular weight of 7,000) was synthesized and a dual-layered polyimide film was formed in the same manner as in Example 3, except that 2,2-bis(3,4-dicarboxyphenyl)hexafluoropropane dianhydride and 3,5-diaminobenzotrifluoride) were mixed in a mole ratio of 0.9:1.

EXAMPLES 7–8

Polyimides (each having a weight average molecular weight of 13,000)were synthesized and dual-layered polyimide films were formed in the same manner as in Examples 1 g of the polyimide was dissolved in 5 g of a solvent mixture containing cyclohexanone and γ-butyrolactone in a ratio of 1:1 by weight, to form a coating mixture and then the coating mixture was spin coated on a silicon substrate. The silicon substrate was thermally-treated at 200° C., resulting in a first polyimide film.

Then, the coating mixture was again spin coated on the silicon substrate having the first polyimide film, and the silicon substrate was thermally-treated at 200°C. to form a second polyimide film, and thus a dual-layered polyimide film was obtained.

EXAMPLE 4

A polyimide (having a weight average molecular weight of 6,000) was synthesized and a dual-layered polyimide film

1 and 2, except that 2,2'-difluorobenzidine was used instead of 2,2'-bis(trifluoromethyl)benzidine. The resulting polyimide may be expressed:

<Examples 9–10>

Polyimides (each having a weight average molecular weight of 13,000) were synthesized and dual-layered polyimide films were formed in the same manner as in Examples 1 and 2, except that tetrafluoro-1,3-phenylenediamine was used instead of 2,2'-bis(trifluoromethyl)benzidine. The resulting polyimide may be expressed:

<Examples 11–12>

Polyimides (each having a weight average molecular weight of 15,000) were synthesized and dual-layered polyimide films were formed in the same manner as in Examples 1 and 2, except that 4,4'-diaminooctafluorobiphenyl was used instead of 2,2'-bis(trifluoromethyl)benzidine.

<Examples 13–14>

Polyimides (each having a weight average molecular weight of 14,000) were synthesized and dual-layered polyimide films were formed in the same manner as in Examples 1 and 2, except that hexafluoro-1,5-diaminonaphthalene was used instead of 2,2'-bis(trifluoromethyl)benzidine.

<Examples 15–16>

Polyimides (each having a weight average molecular weight of 18,000) were synthesized and dual-layered polyimide films were formed in the same manner as in Examples 1 and 2, except that 2,2-bis(4-aminotetrafluorophenyl)hexafluoropropane was used instead of 2,2'-bis(trifluoromethyl)benzidine.

Polyimides (each having a weight average molecular weight of 15,000) were synthesized and dual-layered polyimide films were formed in the same manner as in Examples 1 and 2, except that bis(4-aminotetrafluorophenyl)ether was used instead of 2,2'-bis(trifluoromethyl)benzidine.

<Examples 17–18>

Polyimides (each having a weight average molecular weight of 16,000) were synthesized and dual-layered polyimide films were formed in the same manner as in Examples 1 and 2, except that 4,4'-diaminooctafluorobenzophenone was used instead of 2,2'-bis(trifluoromethyl)benzidine.

<Examples 19–20>

<Examples 21-22>

Polyimides (each having a weight average molecular weight of 16,000) were synthesized and dual-layered polyimide films were formed in the same manner as in Examples 1 and 2, except that 4,4'-diaminooctafluorodiphenylsulfone was used instead of 2,2'-bis(trifluoromethyl)benzidine.

<Example 23>

A polyimide (having a weight average molecular weight of 16,000) was synthesized and a dual-layered polyimide film was formed in the same manner as in Example 1, except that 2,2-bis(3,4-dicarboxyphenyl)hexafluoropropanedianhydride and 2,2'-bis(trifluoromethyl)benzidine were mixed in a mole ratio of 0.83:1.

COMPARATIVE EXAMPLE 1

2,2-bis(3,4-dicarboxyphenyl)hexafluoropropane dianhydride and 2,2'-bis(trifluoromethyl)benzidine in a mole ratio of 1:1, and N,N-dimethylacetamide were mixed, and reacted under a nitrogen atmosphere at room temperature for 24 hours to synthesize a polyamic acid.

1 g of the polyamic acid was dissolved in 5 g of N,N-dimethylacetamide, and spin coated on a silicon substrate.

Then, the silicon substrate was heated to 350° C. for imidization, resulting in a first polyimide film on the substrate.

1 g of the polyamic acid was dissolved in 5g of N-methylpyrrolidone, and the obtained solution was spin coated on the silicon substrate having the first polyimide film. Then, the silicon substrate was heated to 350° C. for imidization, so that a second polyimide film was formed on the first polyimide film, resulting in a dual layered polyimide film.

COMPARATIVE EXAMPLE 2

A polyamic acid was synthesized and a dual-layered polyimide film was formed in the same manner as in Comparative Example 1, except that 2,2-bis(3,4-dicarboxyphenyl)hexafluoropropane dianhydride and 2,2'-bis(trifluoromethyl)benzidine were mixed in a mole ratio of 0.95:1.

COMPARATIVE EXAMPLE 3

A polyamic acid was synthesized and a dual-layered polyimide film was formed in the same manner as in Comparative Example 1, except that 2,2-bis(3,4-dicarboxyphenyl)hexafluoropropane dianhydride and 2,2'-bis(trifluoromethyl)benzidine were mixed in a mole ratio of 0.9:1.

COMPARATIVE EXAMPLE 4

A polyamic acid was synthesized and a dual-layered polyimide film was formed in the same manner as in Comparative Example 1, except that 2,2-bis(3,4-dicarboxyphenyl)hexafluoropropane dianhydride and 2,2'-bis(trifluoromethyl)benzidine were mixed in a mole ratio of 0.87:1.

COMPARATIVE EXAMPLE 5

A polyamic acid was synthesized and a dual-layered polyimide film was formed in the same manner as in Comparative Example 1, except that 2,2-bis(3,4-dicarboxyphenyl)hexafluoropropane dianhydride and 2,2'-bis(trifluoromethyl)benzidine were mixed in a mole ratio of 1:0.95.

COMPARATIVE EXAMPLE 6

A polyamic acid was synthesized and a dual-layered polyimide film was formed in the same manner as in Comparative Example 1, except that 2,2-bis(3,4-dicarboxyphenyl)hexafluoropropane dianhydride and 2,2'-bis(trifluoromethyl)benzidine were mixed in a mole ratio of 1:0.87.

Refractive index and birefringence of the polyimides synthesized in Examples and Comparative Examples were measured at a wavelength of 150mm. The results are shown in FIGS. 1 and 2.

Figure 1:
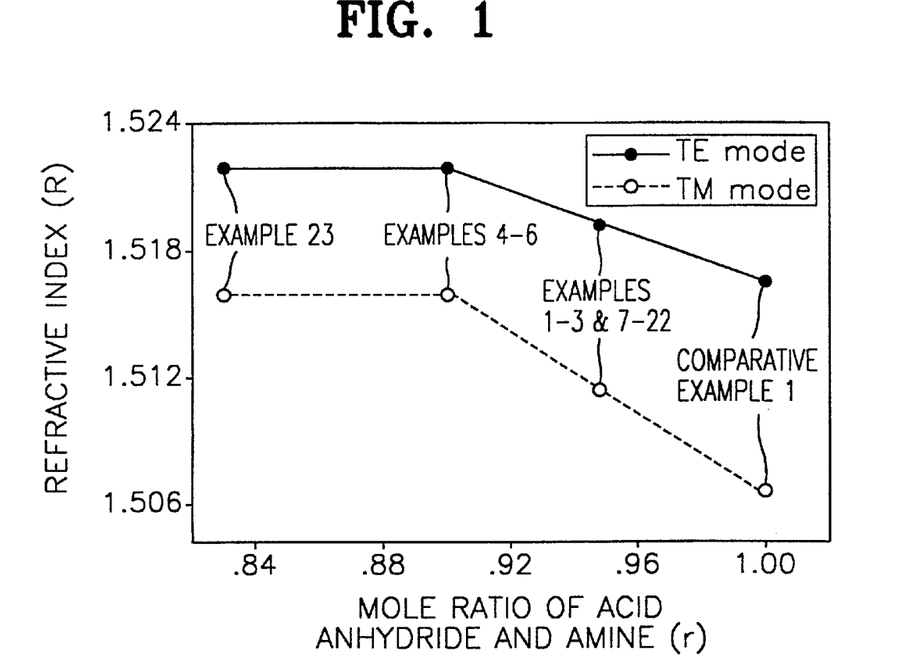
FIG. 1 illustrates changes in the refractive index of transverse electric (TE) and transverse magnetic (TM) modes, depending on the mole ratio of acid anhydride and amine as a monomer for forming polyimide.
Figure 2:
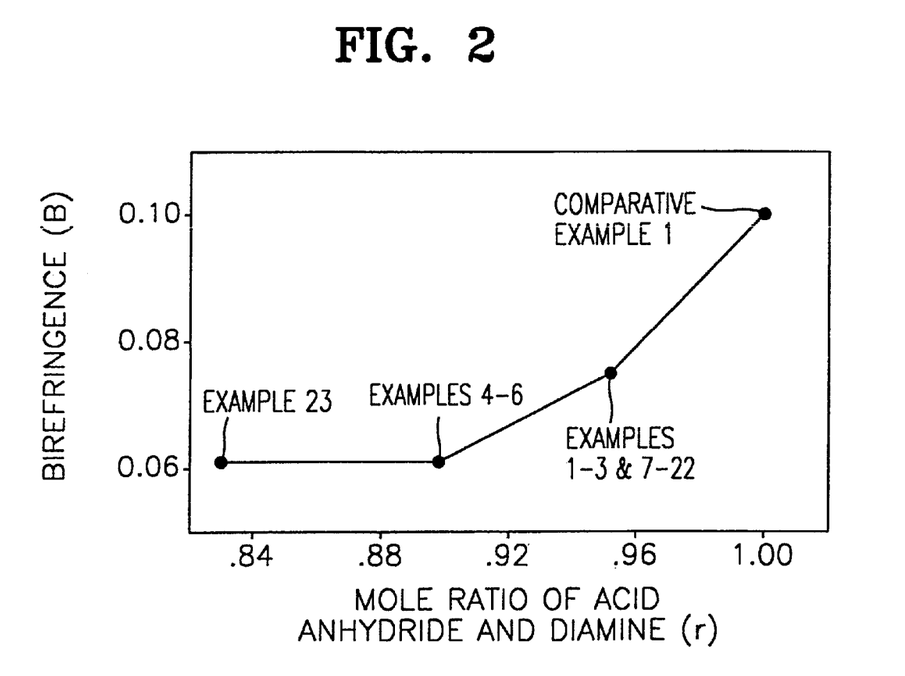
FIG. 2 illustrates changes in the birefringence depending on the mole ratio of acid anhydride and amine as a monomer for forming polyimide

From FIGS. 1 and 2, with an decrease in the mole ratio of acid anhydride and diamine, a weight average molecular weight of the polyimide decreases. As a result, the refractive index of the polyimide increases, whereas the birefringence thereof decreases. And, the polyimides synthesized in Examples 1 through 23 have a lower birefringence and a higher refractive index than that of the Comparative Examples 1–6.

Also, the status of dual-layered polyimide films formed in Examples 1 through 23, and Comparative Examples 1 through 6 was observed. According to the results, in the dual-layered polyimide films formed in Comparative Examples 1 through 6, cracks were detected in a first polyimide film. Meanwhile, cracks were not detected in the dual-layered polyimide films formed in Examples 1 through 23. From the above results, it can be concluded that the dual-layered polyimide films formed in Examples 1 through 23 are stable in an organic solvent due to the network structure.

The polyimide expressed as the formula (1) according to the present invention has a lower birefringence than a common polyimide that is used as a material for optical waveguiding. The problem of waveguiding characteristics in view of the dependency on polarization may be solved. Also, the solubility of polyimide in an organic solvent is lowered, so that the occurrence of cracks in a lower polyimide film, by the organic solvent used to form an upper polyimide film can be avoided, which permits formation of stable multiple polyimide films. Applications of such multiple polyimide films to optical communications devices can be very useful.

What is claimed is:

1. A polyimide for optical communications, expressed by the formula:

$X_1, X_2, X_3, A_1, A_2, B_1, B_2, B_3, D_1, D_2, E_1, E_2, Y_1, Y_2, Y_3, Y_4, Y_5, Y_6, Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —SO$_2$—, —S—, —(T)$_m$—, —(OT)$_m$— and —(OTO)$_m$—wherein T is alkylene or arylene group substituted by at least one of halogen atom and halogenated alkyl group, and m is an integer from 1 to 10; and n is an integer from 1 to 39.

2. The polyimide of claim 1, wherein $A_1$, and $A_2$, are independently fluorine or fluorinated alkyl group;$Y_1, Y_2, Y_3, Y_4, Y_5$, Y6, Y7, and $Y_8$, are independently selected from the group consisting of consisting of fluorine atom, fluorinated alkyl group and fluorinated aryl group; Q is a single bond or selected from the group consisting of —C(CF$_3$)$_2$—, —O—, —CO— and —SO$_2$—; and $D_1$, $D_2$, $E_1$, and $E_2$, are all hydrogen.

3. The polyimide of claim 1, said polyimide being selected from the compounds expressed as follows:

4. The polyimide of claim 1, wherein the polyimide has a weight average molecular weight of 2000–15000.

5. A method of preparing a polyimide for optical communications, the polyimide expressed by the formula (1), the method comprising the steps of:

(a1) polymerizing an acid anhydride (A) and a diamine compound (B), which are shown in the following reaction scheme, in a mole ratio of 0.7:1 to 0.98:1;

(a2) adding a substituted maleic anhydride (C) to the reaction mixture of the step (a) to synthesize a polyamic acid (D); and (a3) imidizing the polyamic acid (D), wherein the reaction scheme is given by -continued X, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —SO$_2$—, —S—, —(T)$_m$—, —(OT)$_m$— and —(OTO)$_m$—wherein T is alkylene or arylene group substituted by at least one of halogen atom and halogenated alkyl group, and m is an integer from 1 to 10; and n is an integer from 1 to 39.

6. The method of claim 5, wherein $A_1$, and $A_2$ are independently fluorine atom or fluorinated alkyl group; $Y_1$, $Y_2$, $Y_3$, $Y_4$, $Y_5$, $Y_6$, $Y_7$, and $Y_8$, are independently selected from the group consisting of fluorine atom, fluorinated alkyl group and fluorinated aryl group; Q is a single bond or selected from the group consisting of —C(CF$_3$)$_2$—, —O—, —CO— and —SO$_2$—; and $D_1$, $D_2$, $E_1$, and $E_2$, are all hydrogen.

7. The method of claim 5, wherein in the step (a2), the amount of the substituted maleic anhydride is in a mole ratio of 0.01–0.3 mole relative to the diamine compound.

8. The method of claim 5, wherein the imidization in the step (a3) is performed by mixing the polyamic acid with acetic anhydride and pyridine and then heating the mixture at 60–150° C., or by adding toluene to the polyamic acid and heating the mixture to the boiling point of toluene.

9. The method of claim 5, wherein in the step (a3), the polyamic acid is imidized through heating at a temperature of 50–400° C.

10. A method of preparing a polyimide for optical communications, the method comprising the steps of:

(b 1) adding a substituted maleic anhydride of formula (C) to a mixture of an acid anhydride (A) and a diamine compound (B) in a mole ratio of 0.7:1–0.98:1, and polymerizing the mixture to synthesize a polyamic acid (D); and (b2) imidizing the polyamic acid (D), wherein the reaction scheme is given by X, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —$SO_2$—, —S—, —$(T)_m$—, —$(OT)_m$— and —$(OTO)_m$—wherein T is alkylene or arylene group substituted by at least one of halogen atom and halogenated alkyl group, and m is an integer from 1 to 10; and n is an integer from 1 to 39.

11. The method of claim 10, wherein $A_1$, and $A_2$ are independently fluorine atom or fluorinated alkyl group; $Y_1$, $Y_2$, $Y_3$, $Y_4$, $Y_5$, $Y_6$, $Y_7$, and $Y_8$, are independently selected from the group consisting of fluorine atom, fluorinated alkyl group and fluorinated aryl group; Q is a single bond or selected from the group consisting of —$C(CF_3)_2$—, —O—, —CO— and —$SO_2$—; and $D_1$, $D_2$, $E_1$, and $E_2$, are all hydrogen.

12. The method of claim 10, wherein in the step (b1), the amount of the substituted maleic anhydride is added in a mole ratio of 0.01–0.3 relative to the diamine compound.

13. The method of claim 10, wherein in the step (b2), the imidization is performed by mixing the polyamic acid with an acetic anhydride and pyridine and then heating the mixture at 60–150° C., or by adding toluene to the polyamic acid and heating the mixture to the boiling point of toluene.

14. The method of claim 10, wherein in the step (b2), the polyamic acid is imidized through heating by steps within a temperature range of 50–400° C.

15. A method of forming multiple polyimide layers by repeating the steps of:

(c1) coating a substrate with a composition containing a polyimide expressed by the formula (1) or a polyamic acid expressed by the formula (2), and a solvent, and heating the substrate to form a first polyimide film; and (c2) coating a composition containing the polyimide expressed by the formula (1) or the polyamic acid expressed by the formula (2), and a solvent, on the first polyimide film formed on the substrate, and heating the resultant structure to form a second polyimide film on the fist polyimide film, wherein the formulas (1) and (2) are $X_1$, $X_2$, $X_3$, $A_1$, $A_2$, $B_1$, $B_2$, $B_3$, $D_1$, $D_2$, $E_1$, $E_2$, $Y_1$, $Y_2$, $Y_3$, $Y_4$, $Y_5$, $Y_6$, $Y_7$, and $Y_8$, are independently selected from the group consisting of hydrogen atom, halogen atom, alkyl group, halogenated alkyl group, aryl group and halogenated aryl group; Z is a simple chemical bond or selected from the group consisting of —O—, —CO—, —$SO_2$—, —S—, —$(T)_m$—, —$(OT)_m$— and —$(OTO)_m$—wherein T is alkylene or arylene group substituted by at least one of halogen atom and halogenated alkyl group, and m is an integer from 1 to 10; and n is an integer from 1 to 39.

16. The method of claim 5, wherein $A_1$, and $A_2$ are independently fluorine atom or fluorinated alkyl group; $Y_1$, $Y_2$, $Y_3$, $Y_4$, $Y_5$, $Y_6$, $Y_7$, and $Y_8$, are independently selected from the group consisting of fluorine atom, fluorinated alkyl group and fluorinated aryl group; Q is a single bond or selected from the group consisting of —$C(CF_3)_2$—, —O—, —CO— and —$SO_2$—; and $D_1$, $D_2$, $E_1$, and $E_2$ are all hydrogen.

17. The method of claim 15, further comprising a step of forming more than one polyimide film on the second polyimide film using the polyimide of the formula (1) or the polyamic acid of the formula (2).

18. The method of claim 15, wherein the solvent is at least one selected from the group consisting of cyclohexanone, γ-butyrolactone and N,N-dimethylacetamide.

19. The method of claim 15, wherein in the case of using the polyamic acid of the formula (2) to form the first and second polyimide films, the heating is performed in steps within a temperature range of 50–400° C.

20. A method for preparing multiple polyimide layers, comprising the steps of:

reacting together to form a first resultant:
  a dianhydride comprising at least one carbon-fluorine bond;
  a diamine comprising at least one carbon-fluorine bond; and
  an anhydride comprising at least one carbon-carbon double bond;
  isolating, heating and drying said first resultant to form a polyimide;
  dissolving said polyimide in a solvent to form a polyimide solution, spin-coating the polyimide solution on a substrate, and thermally treating the spin-coated substrate to form a first polyimide layer; and
  spin-coating said polyimide solution on said first polyimide layer and thermally treating to form a second polyimide layer.

21. The method of claim 20, said step of reacting together the dianhydride, the diamine and the anhydride further comprising:
  mixing together the dianhydride and the diamine for a first period of time; and
  then adding the anhydride to the mixture of the dianhydride and the diamine.

22. The method of claim 20, said step of reacting together the dianhydride, the diamine and the anhydride further comprising:
  having the dianhydride and diamine in a mole ratio in the range of approximately 0.7:1 to 0.98:1.

23. The method of claim 22, said step of reacting together the dianhydride, the diamine and the anhydride further comprising:
  having the anhydride and the diamine in a mole ratio in the range of approximately 0.01:1 to 0.3:1.

24. The method of claim 21, said step of mixing together the dianhydride and the diamine further comprising:
  mixing the dianhydride and diamine in a mole ratio in the range of approximately 0.7:1 to 0.98:1.

25. The method of claim 24, said step of adding the anhydride further comprising:
  adding the anhydride in a mole ratio to the diamine of in the range of approximately 0.01:1 to 0.3:1.

26. The method of claim 20, said step of reacting together the dianhydride, the diamine and the anhydride further comprising:
  adding a solvent to the dianhydride, the diamine and the anhydride.

27. The method of claim 20, said step of reacting together further comprising:
  allowing the dianhydride, the diamine and the anhydride to react for a first period of time to form a reaction mixture; and then
  adding toluene to the reaction mixture and heating the mixture to boiling.

28. The method of claim 20, said step of reacting together further comprising:
  allowing the dianhydride, the diamine and the anhydride to react for a first period of time to form a reaction mixture; and then
  adding acetic anhydride and pyridine to the reaction mixture and allowing the mixture to react under nitrogen.

29. The method of claim 21, said step of mixing together the dianhydride and the diamine further comprising:
  adding a solvent to the dianhydride and the diamine.

30. The method of claim 21, said step of reacting together further comprising:
  after the first period of time and before adding the anhydride, adding toluene to the mixture and heating the mixture to boiling.

31. The method of claim 21, said step of reacting together further comprising:
  after the first period of time and before adding the anhydride, adding acetic anhydride and pyridine to the mixture and allowing the mixture to react under nitrogen.

32. The method of claim 20, further comprising:
  said anhydride being selected from maleic anhydride, monosubstituted maleic anhydride, and disubstituted maleic anhydride.

33. The method of claim 20, said polyimide having an average molecular weight in the range of approximately 2000 to 15000.

34. The method of claim 20, said polyimide having a birefringence of less than about 0.08.

* * * * *